(12) United States Patent
Ouyang et al.

(10) Patent No.: US 9,395,493 B2
(45) Date of Patent: Jul. 19, 2016

(54) 3D POLARIZATION BEAM SPLITTER BASED ON 2D PHOTONIC CRYSTAL SLAB

(71) Applicants: Zhengbiao Ouyang, Shenzhen (CN); Xin Jin, Shenzhen (CN); Zhenyu Lei, Shenzhen (CN)

(72) Inventors: Zhengbiao Ouyang, Shenzhen (CN); Xin Jin, Shenzhen (CN); Zhenyu Lei, Shenzhen (CN)

( * ) Notice: Subject to any disclaimer, the term of this patent is extended or adjusted under 35 U.S.C. 154(b) by 0 days.

(21) Appl. No.: 14/421,730

(22) PCT Filed: Aug. 12, 2013

(86) PCT No.: PCT/CN2013/081298
§ 371 (c)(1),
(2) Date: Feb. 13, 2015

(87) PCT Pub. No.: WO2014/026580
PCT Pub. Date: Feb. 20, 2014

(65) Prior Publication Data
US 2015/0219852 A1 Aug. 6, 2015

(30) Foreign Application Priority Data

Aug. 15, 2012 (CN) .......................... 2012 1 0290347

(51) Int. Cl.
| | |
|---|---|
| *G02B 6/27* | (2006.01) |
| *G02B 6/122* | (2006.01) |
| *G02B 6/126* | (2006.01) |
| *B82Y 20/00* | (2011.01) |
| *G02B 6/12* | (2006.01) |

(52) U.S. Cl.
CPC ............... *G02B 6/2726* (2013.01); *B82Y 20/00* (2013.01); *G02B 6/126* (2013.01); *G02B 6/1225* (2013.01); *G02B 6/12002* (2013.01)

(58) Field of Classification Search
CPC .... G02B 6/2706; G02B 6/2726; G02B 1/005; G02B 27/283
See application file for complete search history.

(56) References Cited

U.S. PATENT DOCUMENTS

| | | | |
|---|---|---|---|
| 6,515,778 B1 | 2/2003 | Epworth et al. | |
| 7,046,878 B2* | 5/2006 | Noda ................... | G02B 6/1225 385/11 |
| 9,164,232 B2* | 10/2015 | Ouyang ............... | G02B 6/1225 |

(Continued)

FOREIGN PATENT DOCUMENTS

| | | |
|---|---|---|
| CN | 1530672 | 9/2004 |
| CN | 102809782 | 12/2012 |

*Primary Examiner* — Daniel Petkovsek
(74) *Attorney, Agent, or Firm* — Hamre, Schumann, Mueller & Larson, P.C.

(57) ABSTRACT

The present invention discloses a 3D polarization beam splitter based on 2D photonic crystal slabs which comprises a 2D photonic crystal slab positioned at the top part, a 2D photonic crystal slab positioned at the bottom part and perpendicular to the top 2D photonic crystal slab, and an input coupling dielectric block; a P polarization wave output waveguide is positioned in the top 2D photonic crystal slab; an S polarization wave output waveguide is positioned in the bottom 2D photonic crystal slab; the output port of the P polarization wave output waveguide and the output port of the S polarization wave output waveguide are apart from each other in 3D space; the photonic crystal slabs include a background dielectric material and dielectric rods. The structure of the present invention has a small volume, high degree of polarization, high light transmission efficiency; it is convenient for optical integration and highly efficient; it is suitable for large-scale optical integrated circuits; and it can realize the polarization beam splitting function for different wavelengths.

10 Claims, 4 Drawing Sheets

(56) References Cited

U.S. PATENT DOCUMENTS 9,170,375 B2 * 10/2015 Ouyang ............... G02B 6/2773
9,207,400 B2 * 12/2015 Ouyang ................. G02B 6/126
2002/0180981 A1 12/2002 Ducellier et al.

* cited by examiner

3D POLARIZATION BEAM SPLITTER BASED ON 2D PHOTONIC CRYSTAL SLAB

This application claims priority to Chinese Application No. 201210290347.5, filed on Aug. 15, 2012 and International Application No. PCT/CN2013/081298 filed on Aug. 12, 2013, the entire contents of which are hereby incorporated by reference.

FIELD OF THE INVENTION

The present invention relates to the field of electromagnetic wave polarization beam splitter, in particular, to a polarization beam splitter based on photonic crystal.

BACKGROUND OF THE INVENTION

Currently, most polarization beam splitters are large in volume, and can hardly be used in optical integrated circuits. However, micro devices including the polarization beam splitter can be manufactured on the basis of photonic crystals. Up to now, there are two kinds of polarization beam splitter based on photonic crystals, one of which utilizes a photonic crystal with an S-polarization-wave bandgap and a P-polarization-wave transmission band, or with a P-polarization-wave bandgap and an S-polarization-wave transmission band to realize the polarization splitting of the wave. This kind of polarization beam splitter can only be used as a separate photonic crystal device in conventional optical waveguides, and is difficult to be integrated into other photonic crystal devices, since the transmittance and degree of polarization thereof are poor. The other kind is based on coupled waveguides with different relative coupling lengths for coupling light waves in different polarization states into different waveguides by means of long-distance coupling between waveguides, utilizing the method of periodic coupling and odd-even state alternation between the waveguides. The polarization beam splitters obtained by the two methods mentioned above, still have a relative large volume and a narrow range of operation wavelength, so they are not conducive to practical applications.

SUMMARY OF THE INVENTION

The object of the present invention is to overcome the shortcomings in the prior arts, and to provide a polarization beam splitter based on photonic crystals that has small structure volume, high degree of polarization and high light transmission efficiency, and is suitable for large-scale optical integrated circuits.

To solve the problems mentioned above, the present invention is realized through the following technical schemes.

The 3D polarization beam splitter based on the 2D photonic crystal slab according to the present invention comprises a 2D photonic crystal slab positioned at the top part, a 2D photonic crystal slab positioned at the bottom part and perpendicular to the top 2D photonic crystal slab, and an input coupling dielectric block; a P-polarization-wave output waveguide is positioned in the top 2D photonic crystal slab; an S polarization-wave output waveguide is positioned in the bottom 2D photonic crystal slab; the output port of the P-polarization-wave output waveguide and the output port of the S-polarization-wave output waveguide are apart from each other in 3D space; the photonic crystal slabs include a background dielectric material and dielectric rods.

The P-polarization-wave output waveguide positioned in the top part is a photonic crystal planar waveguide, is formed by respectively removing a half row of the dielectric rods in the lower part and the right part of the photonic crystal slab, and has a shape of rectangle square; the cross section of the photonic crystal planar waveguide is a rectangle.

The input coupling dielectric block is a cube-shaped block, and the input coupling dielectric block is positioned at the middle part of the junction part of the P-polarization-wave output waveguide and the S-polarization-wave output waveguide.

The S-polarization-wave output waveguide in the bottom part is a photonic crystal planar waveguide, is formed by respectively removing a half row of the dielectric rods in the front part and the right part of the photonic crystal slab, and has a shape of rectangle square; the cross section of the photonic crystal planar waveguide is a rectangle.

The background dielectric material is air or other dielectric material with a refractive index lower than that of the dielectric rod.

The input coupling dielectric block is connected to the input waveguide, and the inner surface of the input waveguide is connected to the outer surface of the input coupling dielectric block.

The shape of the dielectric rods in the photonic crystal slab is a cubic cylinder, a rectangular cylinder, a cylinder, an elliptical cylinder, a triangular cylinder, or other polygon cylinders.

The structure of the photonic crystal is a tetragonal lattice, a triangular lattice, or a hexagonal lattice.

The input coupling dielectric block inputs an electromagnetic wave with mixed mode, the S-polarization-wave output waveguide in the bottom photonic crystal slab outputs an S-polarization wave, and the P-polarization-wave output waveguide in the top photonic crystal slab outputs a P-polarization wave.

The input coupling dielectric block is connected to a photonic crystal waveguide with a complete bandgap or a conventional full-polarization-state waveguide; and the output port is connected to a photonic crystal waveguide with a complete bandgap, a conventional full-polarization-state waveguide, a single-polarization-state waveguide based on photonic crystal, or a conventional single-polarization-state waveguide.

The action of the photonic crystal on the electromagnetic wave can be described by using the effective refractive index. The effective refractive index of the photonic crystal depends on the lattice constant, the duty ratio, the refractive index of the dielectric material, and the refractive index of the background dielectric material. The difference between the effective refractive indexes in different polarization directions could be very large by choosing suitable parameter composition, so that the effect of polarization beam splitting can be achieved while the electromagnetic wave travels a relative short distance in the photonic crystal. By using the difference of the effective refractive indexes for different polarizations, and designing a proper array of the dielectric rods, the 2D polarization beam splitter can be designed. The 2D polarization beam splitter can split the electromagnetic wave into the S-polarization wave and the P-polarization wave well in 2D space, but the angle between the S-polarization wave and the P-polarization wave is relatively small, for example, the left-right splitting angle in 2D space is only about 10°. The 3D polarization beam splitter based on 2D photonic crystal slab provided in the present invention, however, can split the S-polarization wave and the P-polarization in 3D space with a high degree of polarization and a large operating wavelength range.

Compared with the prior arts, the present invention has the following advantages:

(1) The present invention does not utilize the polarization splitting method based on Brewster angle and the like, and does not split light by means of long waveguide coupling; most polarization beam splitters based on photonic crystal are waveguides added with some dielectric rods to alter the transmission and the reflection of S-polarization wave and P-polarization wave, while the waveguide according to the present invention can achieve the effect of beam splitting without any additional dielectric rods.

(2) The specific geometry structure according to the present invention can well self-couple the S-polarization wave and the P-polarization wave.

(3) The structure has the advantages of small volume, high degree of polarization, high light transmission efficiency, and is suitable for large-scale optical integrated circuits.

(4) The present invention can completely realize the polarization separation function via two kinds of dielectric defect rods in a small volume, thus it is convenient for optical integration and is highly efficient.

(5) The present invention can realize the polarization beam splitting function for different wavelengths by the method of scaling the lattice constant and other geometric parameters utilizing the scaling property of photonic crystals.

DETAILED DESCRIPTION OF THE INVENTION

A detailed description for the present invention will be given below in combination with the accompanying figures.

Figure 1:
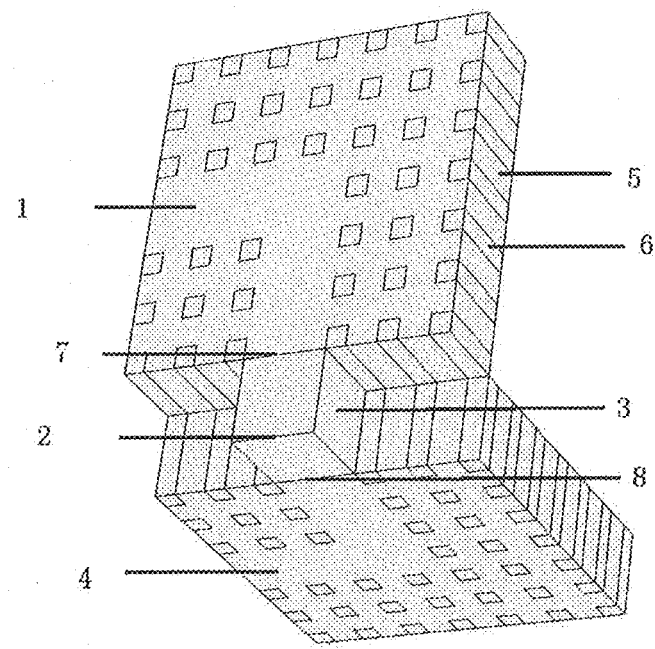
FIG. 1 is the rear-view schematic diagram of the structure according to the present invention which includes:
P-polarization-wave output waveguide 1
input coupling dielectric block 2
signal light waveguide input port 3
S-polarization-wave output waveguide 4
dielectric material with low refractive index 5
dielectric rod with high refractive index 6
P-polarization-wave beam splitting output port 7
S-polarization-wave beam splitting output port 8
Figure 2:
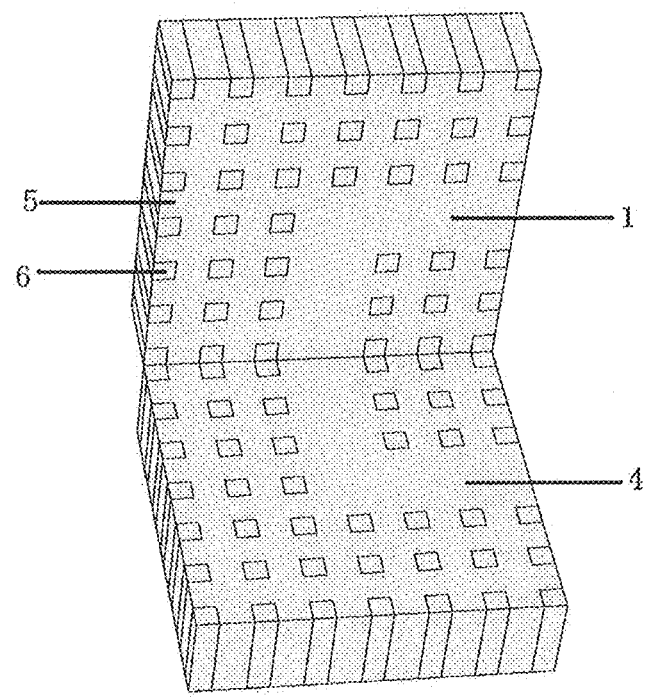
FIG. 2 is the schematic diagram of the structure from another viewing angle (front view).

As shown in FIG. 1, the boundary 7 and the boundary 8 have different effective refractive indexes for the lights with different polarization states. Generally, the effective refractive indexes in a waveguide are:

$$n_{eff}^S = \frac{\int_\Omega n_e E_\perp^2 \, d\Omega}{\int_\Omega E_\perp^2 \, d\Omega}, \quad (1)$$

$$n_{eff}^P = \frac{\int_\Omega n_o (E_\perp^2 + E_{//}^2) \, d\Omega}{\int_\Omega (E_\perp^2 + E_{//}^2) \, d\Omega}, \quad (2)$$

in which, $n_{eff}^S$ and $n_{eff}^P$ correspond to the effective refractive indexes of the S-polarization wave and the P-polarization wave respectively, z is the propagation direction of the wave, x and y are perpendicular to each other and perpendicular to the propagation direction of the wave, and $E_\perp$ and $E_{//}$ are the electric field components of the electric vector of the wave in the waveguide respectively perpendicular to and parallel to the propagation direction of the wave. A uniform coordinate system (x, y, z) is chosen, in the input coupling port, z direction corresponds to the propagation direction of the light wave and this direction is parallel to the junction line of the photonic crystal slab in the vertical plane and the photonic crystal slab in the horizontal plane; in the photonic crystal waveguide in the vertical plane, at the beginning, x direction corresponds to the propagation direction of the light wave, after turning, z direction corresponds to the propagation direction of the light wave; in the photonic crystal waveguide in the horizontal plane, at the beginning, y direction corresponds to the propagation direction of the light wave, after turning, z direction corresponds to the propagation direction of the light wave.

The reflective index and the refractive index of the light wave in the waveguide at the end surface can be expressed as:

$$R_S = \left(\frac{n_{eff}^S - 1}{n_{eff}^S + 1}\right)^2, \quad (3)$$

$$T_S = \frac{4 n_{eff}^S}{(n_{eff}^S + 1)^2},$$

$$R_P = \left(\frac{n_{eff}^P - 1}{n_{eff}^P + 1}\right)^2, \quad (4)$$

$$T_P = \frac{4 n_{eff}^P}{(n_{eff}^P + 1)^2}.$$

The function of passing the S-polarization wave and rejecting the P-polarization wave, or passing the P-polarization wave and rejecting the S-polarization wave can be achieved by utilizing the perpendicularly positioned 2D photonic crystal slabs.

Without loss of generality, the photonic crystal slab structure formed by cubic cylinders is taken as an example hereinafter. Furthermore, the lattice constants of the photonic crystals are all 1 μm. According to the scaling principle of photonic crystals, in other situations, for example, when the lattice constant of the photonic crystal is a μm, all that is needed is to magnify all the other geometric size parameters by a times and magnify the operating wavelength to be a times of the operating wavelength of the photonic crystal with the lattice constant of 1 μm The waveguide is constructed as follows, the bottom surface of the dielectric rods is square, the side length of the square is 0.4 μm, the height of the dielectric rods is 1.6 μm, and the refractive index of the dielectric rods is 3. The background material is air. The structure of the P-polarization-wave output waveguide is formed of 7×7 dielectric rods, the distance between the adjacent dielectric rods is 1 μm, namely, the lattice constant is 1 μm, and the height is 1.6 μm. The structure of the right side P-polarization-wave output waveguide is formed of 7×7 dielectric rods, the distance between the adjacent dielectric rods is 1, and the height is 1.6 μm. The input coupling port is a cube, and the length, the width and the height of the cube are all 1.6 μm. The input coupling port should be connected to some photonic crystal waveguides with a complete bandgap structure, such as the monocrystal tellurium structure, the honeycomb structure, the triangle structure, the cymophane structure, and the like.

Except the end side surfaces 7, 8 and 3, the other 3 surfaces of the cube 2 are all boundaries of the signal light waveguide; the effective refractive index at the boundary depends on the characteristic of the waveguide. Such kind of waveguide can be the photonic crystal waveguide with a complete bandgap or the conventional full-polarization-state waveguide.

At the same time, each 2D photonic crystal slab should be covered in the third dimension to reduce the scattering loss. For example, other boundaries can be added for covering. For another example, a 1D photonic crystal with a corresponding photonic bandgap can be added for covering.

Figure 3:
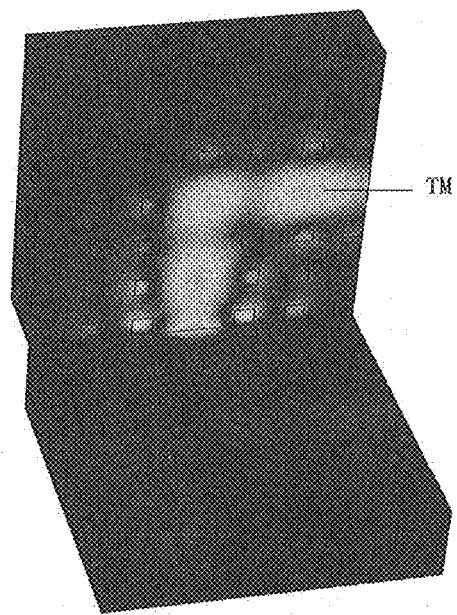
FIG. 3 is the schematic diagram of the simulated result for the input light comprising a P-polarization wave.
Figure 4:
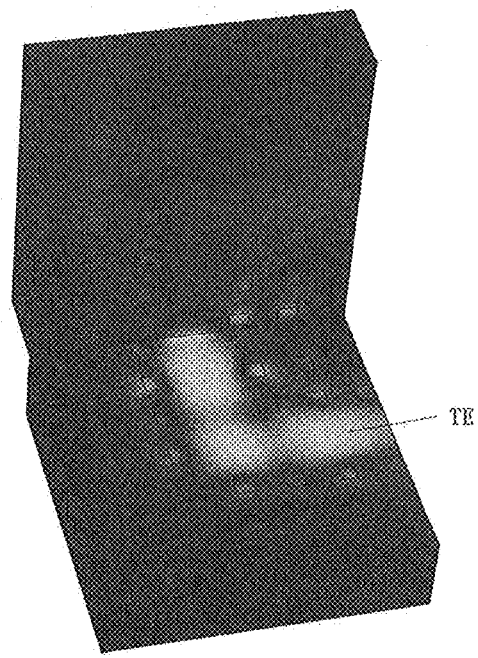
FIG. 4 is the schematic diagram of the simulated result for the input light comprising an S-polarization wave.
Figure 5:
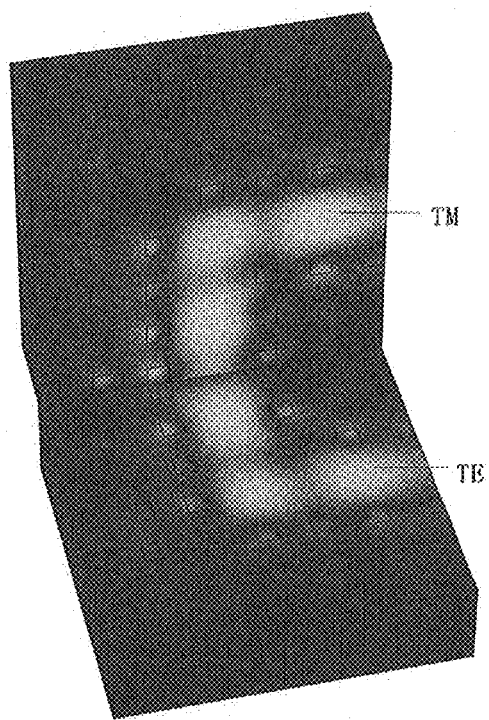
FIG. 5 is the schematic diagram of the simulated result, while the input light is a mixed light of the S-polarization wave and the P-polarization wave.

The fundamental principle of the present invention is that, the wave containing an S-polarization wave and a P-polarization wave is inputted into the input port of the coupling port, or the input wave is an S-polarization wave or a P-polarization wave; for the input of an S-polarization wave, in the input coupling port, the electric field vector is in x direction, the propagation direction of the wave is z direction, and this is coincide with the direction of the electric field vector of the S-polarization wave in the waveguide in the horizontal plane, so that the S-polarization wave is transmitted into the waveguide in the horizontal plane, that is to say, it is transmitted in the waveguide 4; for the input wave of a P-polarization wave, in the input coupling port, the electric field vector is in y direction, the propagation direction of the wave is z direction, and this is coincide with the direction of the electric field vector of the S-polarization wave in the waveguide in the vertical plane, so that the P-polarization wave is transmitted into the waveguide in the vertical plane, that is to say, it is transmitted in the waveguide 1, and the inputted P-polarization wave is transformed into an S-polarization wave in the waveguide in the vertical plane; thus it can be further deduced that, when the input wave is a combination of the S-polarization wave and the P-polarization wave, the S-polarization wave therein is transmitted into the waveguide 4 and is output in the form of an S-polarization wave, the P-polarization wave therein is transmitted into the waveguide 1 and is also output in the form of an S-polarization wave, but the two S-polarization waves are apart from each other in space, wherein the S-polarization wave in the vertical plane is transformed from the P-polarization wave in the input wave, as shown in FIG. 1. Therefore, by using the structure of the present invention, the effect of splitting an S-polarization wave and a P-polarization wave can be achieved, as shown in FIGS. 3-5.

The output port of the output waveguide is connected to the photonic crystal waveguide with a complete bandgap structure, or the conventional full-polarization-state waveguide, or the single-polarization-state waveguide based on photonic crystal, or the conventional single-polarization-state waveguide.

The degrees of the polarization in the waveguide can be defined as:

$$S\text{-polarization wave: } D_S = \left|\frac{I_S - I_P}{I_S + I_P}\right|, \quad (5)$$

$$P\text{-polarization wave: } D_P = \left|\frac{I_P - I_S}{I_P + I_S}\right|. \quad (6)$$

The extinction ratios can be defined as:

$$S\text{-polarization wave: } R_S = 10 \times \log_{10}\left(\frac{I_S}{I_P}\right), \quad (7)$$

$$P\text{-polarization wave: } R_P = 10 \times \log_{10}\left(\frac{I_P}{I_S}\right). \quad (8)$$

Figure 6:
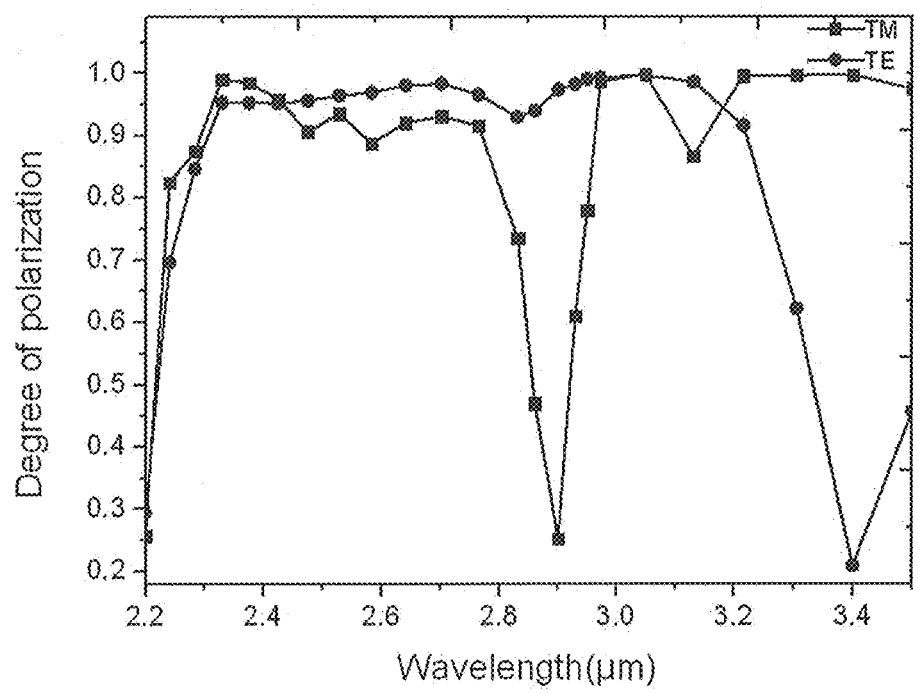
FIG. 6 shows the degree of the polarization of the S-polarization-wave output from the S-polarization-wave output port positioned in the bottom part, and the degree of the polarization of the P-polarization-wave output from the P-polarization-wave output port positioned in the top part.

As shown in FIG. 6, the degree of the polarization of the S-polarization wave within the wavelength range of 2.30-3.24 μm is more than 0.85, and with respect to the P-polarization wave within the wavelength range of 2.30-2.78 μm and 2.96-3.24 μm, the degree of polarization reaches 0.85. Therefore, within the wavelength range of 2.30-2.78 μm and 2.96-3.24 μm, the degrees of polarization of the S-polarization wave and the P-polarization wave can both reach 0.85. In particular, within the wavelength range of 2.33-2.43 μm, the degrees of the polarization of the S-polarization wave and the P-polarization wave are more than 0.95; within the wavelength range of 2.97-3.05 μm, the degrees of the polarization of the S-polarization wave and the P-polarization wave are more than 0.98.

Figure 7:
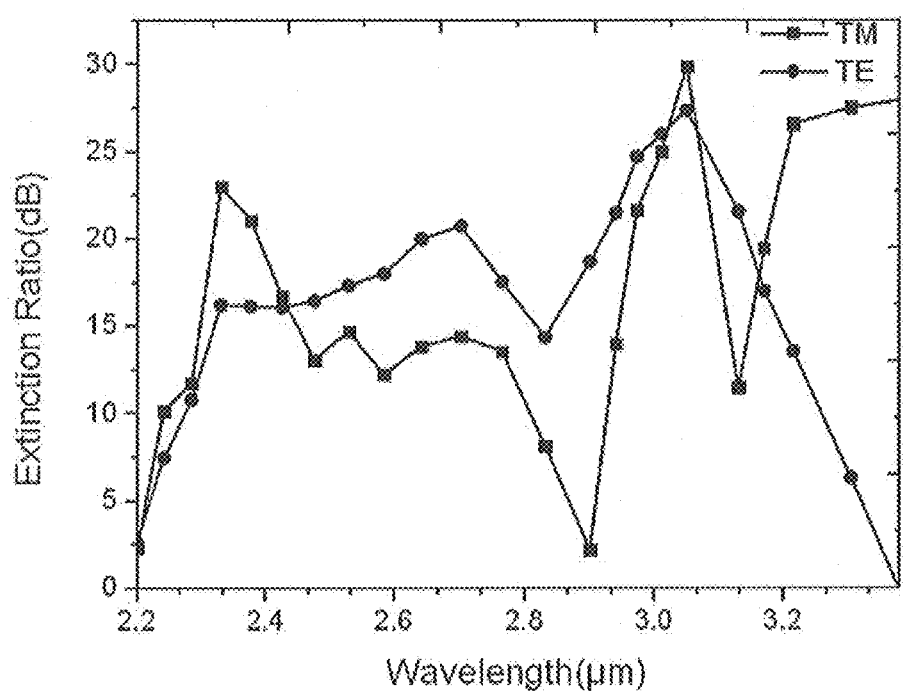
FIG. 7 shows the extinction ratio of the S-polarization-wave output from the S-polarization-wave output port, and the extinction ratio of the P-polarization-wave output from the P-polarization-wave output port.

As shown in FIG. 7, the extinction ratio of the S-polarization wave within the wavelength range of 2.30-3.24 μm is more than 10 dB, and with respect to the P-polarization wave within the wavelength range of 2.25-2.80 μm and 2.94-3.24 μm, the extinction ratio is more than 10 dB. Therefore, within the wavelength range of 2.30-2.80 μm and 2.94-3.24, the extinction ratios of the S-polarization wave and the P-polarization wave are both more than 10 dB. In particular, within the wavelength range of 2.33-2.43 μm, the extinction ratios of the S-polarization wave and the P-polarization are more than 16 dB; within the wavelength range of 2.97-3.07 μm, the extinction ratios of the S-polarization wave and the P-polarization wave are more than 21 dB.

In conclusion, within the wavelength range of 2.30-2.78 μm and 2.96-3.24 μm, the degrees of the polarization of the S-polarization wave and the P-polarization wave are more than 0.85, and the extinction ratios reach 10 dB. Practical value is provided in this wavelength range. In particular, within the wavelength range of 2.33-2.43 μm, the degrees of the polarization of the S-polarization wave and the P-polarization wave are more than 0.95, and the extinction ratios are more than 16 dB; within the wavelength range of 2.97-3.05 μm, the degrees of the polarization of the S-polarization wave and the P-polarization wave are more than 0.98, and the extinction ratios are more than 21 dB. So that, higher practical value is provided in these two wavelength ranges. By means of the two perpendicularly positioned 2D photonic crystal slabs and the directional self-coupling waveguide, the photonic crystal polarization beam splitter provided in the present invention can achieve the function of splitting the S-polarization wave and the P-polarization wave with high efficiency in any photonic crystal structure with a photonic bandgap.

What we claim is:

1. A three dimensional polarization beam splitter (3D-PBS) based on two 2D photonic crystal slabs, wherein said 3D-PBS based on two 2D photonic crystal slabs comprising: a 2D photonic crystal slab positioned at the top part of the 3D-PBS, a 2D photonic crystal slab positioned at the bottom part of the 3D-PBS and perpendicular to said top 2D photonic crystal slab, and an input coupling dielectric block; a P polarization wave output waveguide positioned in said top 2D photonic crystal slab; an S polarization wave output waveguide positioned in said bottom 2D photonic crystal slab; said output port of the P polarization wave output waveguide and the output port of the S polarization wave output waveguide are apart from each other in 3D space; and said two photonic crystal slabs consisting of a background dielectric material and dielectric rods.

2. The 3D-PBS according to claim 1, wherein said P polarization wave output waveguide positioned in the top part of the 3D-PBS is a photonic crystal planar waveguide, is formed by respectively removing a half row of the dielectric rods in the lower part and the right part of the photonic crystal slab, and has a shape of rectangle square; the cross section of said photonic crystal planar waveguide is a rectangle.

3. The 3D-PBS according to claim 1, wherein said input coupling dielectric block is a cube-shaped block, and said input coupling dielectric block is positioned at the middle part of the junction part of the P polarization wave output waveguide and the S polarization wave output waveguide.

4. The 3D-PBS according to claim 1, wherein said S polarization wave output waveguide in the bottom part of the 3D-PBS is a photonic crystal planar waveguide, is formed by respectively removing a half row of the dielectric rods in the front part and the right part of the photonic crystal slab, and has a shape of rectangle square; the cross section of said photonic crystal planar waveguide is a rectangle.

5. The 3D-PBS according to claim 1, wherein said background dielectric material is air or other dielectric material with a refractive index lower than that of the dielectric rod.

6. The 3D-PBS according to claim 1, wherein said input coupling dielectric block is connected to an input waveguide, and the inner surface of said input waveguide is connected to the outer surface of the input coupling dielectric block.

7. The 3D-PBS according to claim 1, wherein said shape of the dielectric rods in the photonic crystal slab is a cubic cylinder, a rectangular cylinder, a cylinder, an elliptical cylinder, a triangular cylinder, or other polygon cylinders.

8. The 3D-PBS according to claim 1, wherein a structure of photonic crystal is a tetragonal lattice, a triangular lattice, or a hexagonal lattice.

9. The 3D-PBS according to claim 1, wherein said input coupling dielectric block inputs an electromagnetic wave with mixed mode, the S polarization wave output waveguide in the bottom photonic crystal slab outputs an S polarization wave, and the P polarization wave output waveguide in the top photonic crystal slab outputs a P polarization wave.

10. The 3D-PBS according to claim 1, wherein said input coupling dielectric block is connected to a photonic crystal waveguide with a complete bandgap or a conventional full-polarization-state waveguide; and said output port is connected to a photonic crystal waveguide with a complete bandgap, a conventional full-polarization-state waveguide, a single-polarization-state waveguide based on photonic crystal, or a conventional single-polarization-state waveguide.

* * * * *